United States Patent [19]

Stonehart et al.

[11] Patent Number: 5,225,391
[45] Date of Patent: Jul. 6, 1993

[54] ELECTROCATALYST FOR ANODE

[75] Inventors: Paul Stonehart, Madison, Conn.; Nobuo Yamamoto; Kazunori Tsurumi; Toshihide Nakamura; Noriaki Hara, all of Kanagawa, Japan

[73] Assignees: Tanaka Kikinzoku Kogyo K.K., Tokyo, Japan; Stonehart Associates Inc., Madison, Conn.

[21] Appl. No.: 840,083

[22] Filed: Feb. 24, 1992

[30] Foreign Application Priority Data

Feb. 23, 1991 [JP] Japan .................................. 3-50405

[51] Int. Cl.$^5$ ........................ B01J 23/34; B01J 23/42; B01J 23/89
[52] U.S. Cl. ..................................... 502/324; 429/40; 429/44
[58] Field of Search ....................... 502/101, 185, 324; 429/44, 40

[56] References Cited

U.S. PATENT DOCUMENTS

| 4,954,474 | 9/1990 | Tsurumi et al. | 502/101 X |
| 5,024,905 | 6/1991 | Itoh et al. | 502/326 X |
| 5,079,107 | 1/1992 | Jalan | 502/326 X |

Primary Examiner—W. J. Shine
Attorney, Agent, or Firm—Sughrue, Mion, Zinn, Macpeak & Seas

[57] ABSTRACT

Disclosed is an electrocatalyst which comprises an inorganic support and four-element alloy essentially consisting of 10 to 39 atomic percent of platinum, 30 to 5 atomic percent of nickel, 30 to 5 atomic percent of cobalt and 30 to 3 atomic percent of manganese supported on the inorganic support. The electrocatalyst possesses excellent anti-poisoning against carbon monoxide.

1 Claim, No Drawings

ELECTROCATALYST FOR ANODE

BACKGROUND OF THE INVENTION

The present invention relates to a four-element catalyst employed for various chemical reactions, especially for an electrocatalyst for anode of a fuel cell.

A carbon catalyst supported with element platinum as electrode material has been heretofore widely employed as an electrocatalyst for anode of a fuel cell.

However, as an anode gas of the fuel cell, such a reformed gas as a liquefied natural gas (LNG) is employed in which a carbon monoxide gas (CO) is contained.

Platinum is likely to adsorb the carbon monoxide gas which results in considerable poisoning at a low temperature.

In order to avoid the poisoning, the fuel cell is operated at a temperature more than 190° C. to reduce the influence of the carbon monoxide.

In the fuel cell having the element platinum catalyst, its reaction is conducted at a temperature more than that required inevitably employing disadvantageous various operation conditions encountered in higher temperature reactions. Further, the poisoning cannot be completely avoided even under said conditions resulting in the advance of polarization to invite the lowering of electrode performance.

A fuel cell employing a solid polymer electrolyte (SPE) possesses a problem that the poisoning of the element platinum with the carbon monoxide is hardly avoided because of a lower operation temperature due to the weakness of the electrolyte against heat.

In order to overcome these problems, a catalyst comprising a platinum-palladium or a platinum-ruthenium alloy is already known.

However, the improvement attained by employing these catalysts is unsatisfactory and a further improvement is desirably requested.

SUMMARY OF THE INVENTION

An object of the present invention is to provide an electrocatalyst free from the above drawbacks of the prior art.

Another object is to provide an electrocatalyst for anode of a fuel cell having excellent anti-poisoning against carbon monoxide.

A further object is to provide an electrocatalyst for anode of a fuel cell which can be manufactured at a lower cost.

The present invention is an electrocatalyst which comprises an inorganic support and four-element alloy essentially consisting of 10 to 39 atomic percent of platinum, 30 to 5 atomic percent of nickel, 30 to 5 atomic percent of cobalt and 30 to 3 atomic percent of manganese supported on the inorganic support.

The present invention employs as an electroactive substance platinum-nickel-cobalt-manganese in place of a conventional electrocatalyst.

The poisoning of the conventional electrocatalyst especially with carbon monoxide is considerably large so that a lowering of its cell voltage may be invited.

The electrocatalyst of the present invention enables the operation with the effective depression of the poisoning with the carbon monoxide by adding the nickel, the cobalt and the manganese to the platinum.

DETAILED DESCRIPTION OF THE INVENTION

By employing the electrocatalyst of the invention, the poisoning of platinum particles can be depressed to a considerable degree.

The electrocatalyst of the present invention comprises an inorganic support and a catalyst essentially composed of platinum, nickel, cobalt and manganese supported on the support, and may contain a small amount of other precious metals or base metals than the above catalyst metals or any other impurities providing no harmful effects on the catalyst performance.

The composition of the above catalyst is 10 to 39 atomic percent of the platinum, 30 to 5 atomic percent of the nickel, 30 to 5 atomic percent of the cobalt and 30 to 3 atomic percent of the manganese, and is preferably 39 atomic percent, 26 atomic percent, 26 atomic percent and 9 atomic percent in this turn.

The support on which the respective metals are supported may not be restricted as long as the support is a porous inorganic substance, but it is most preferable to employ an inorganic oxide support such as silica and alumina, and a carbon support when the precious metals are supported as they are.

A method of supporting these precious metals is not especially restricted. A conventional heat decomposition method which consists of covering a solution dissolving compounds of the respective precious metals on the support by means of applying or the like and of thermally treating said precious metal compounds applied to decompose and convert them into the corresponding precious metals, may be employed.

Since, however, the thermal treatment is likely to bring about agglomeration of the precious metal particles to deteriorate the electrode performance, a following method may be preferably employed for obtaining a four-element catalyst having a more uniform particle size and high performance.

At first, a platinum metal is made to be supported onto the inorganic support, especially carbon support. The supporting of the platinum metal can be carried out according to any conventional method. One of the conventional methods comprises impregnating the solution of a platinum containing ion, for example, an aqueous solution of chloroplatinic acid into the carbon support, reducing the platinum containing ion and depositing the reduced platinum metal onto the carbon support. If, however, a strong reductant is employed in these reactions for reduction, the size of platinum particles increases so that the surface area of the particles per unit weight considerably decreases. For this reason, such a weak reductant as sodium thiosulfate ($Na_2S_2O_3 \cdot 5H_2O$) and potassium thiosulfate is preferably employed to depress the decrease of the surface area of the platinum. The said sodium and potassium thiosulfates react with the platinum containing ion, that is, the chloroplatinic ion to form finely divided metal sol having a large surface area.

This sol is then adsorbed onto the carbon support to provide the carbon support supported with the platinum through appropriate procedures such as drying.

In other words, when the said solution becomes nearly opaque, the carbon support is added into the solution and then the liquid phase of the formed slurry is forced to penetrate into the pores of the carbon support by means of agitation employing, for example, a supersonic wave agitator. The thicker slurry is formed by this procedure, which remains suspended and seldom precipitates. Drying of this slurry e.g. at 75° to 80° C. for 1 to 3 days for removing water provides dried powder containing the salt of a reaction by-product. The by-product may be dissolved and removed by extracting the dried powder several times with, for instance, 100 to 200 ml of distilled water. The catalyst thus obtained has a large surface area.

Then, other metals than the platinum, that is, nickel, cobalt and manganese are desirably supported onto the carbon support having been supported with the platinum and are alloyed by heating the platinum and these metals. However, it is not preferable to employ an ordinary alloying method for alloying them because the produced alloy agglomerates to decrease the surface area at a high temperature. For this reason, ammonium hydroxide or the like is initially added to the warm aqueous solution of an organic acid salt preferably a formate or an acetate of said metals to be added to the platinum as manganese, nickel and cobalt to convert the acid salt into the corresponding metal salt of the organic acid amine preferably the metal salts of formic acid amine or acetic acid amine.

When an ordinary metal salt (e.g. nitrate) is thermally treated in a conventional process, high temperature reduction is necessary to alloy platinum with a fire-resistant oxide formed by the heat treatment so that the crystal growth (decrease of surface area) may occur prior to the alloying of the platinum. On the other hand, by employing the above procedure, the metal salt can easily be reduced at a relatively low temperature with the minimum decrease of the surface area.

After, if necessary, impure metals in the metal salts are removed by extraction and dried, the metal salts are reduced in hydrogen, for example, at 250° C. for 30 minutes and then the metals are alloyed at an elevated temperature e.g. 700° C.

In case of preparing the four-element catalyst containing the platinum, the amount of the metal salts of the organic acid amines is so adjusted that 10 to 39 atomic percent of the platinum and each of 3 or 5 to 30 atomic percent of the second, third and fourth metals, most preferably 39 atomic percent of the platinum, each 26 atomic percent of the second and third metals and 9 atomic percent of the fourth metal are contained in the catalyst.

The catalyst according to the present invention may be prepared not only by the above preparing process in which the platinum is supported before the other metals are supported but also by the process in which the platinum is supported after the other metals are supported.

EXAMPLE

Although an Example of the invention will be described, this Example is not intended to limit the scope of the present invention.

EXAMPLE

Chloroplatinic acid containing 0.04 g of platinum was dissolved in 300 ml of water in a vessel of a which a volume was 0.5 liter. To this solution, 75 ml of a solution in which 1.2 g of $Na_2S_2O_3.5H_2O$ was dissolved was added to prepare a mixed solution.

On the other hand, 7.8 g of Acetylene Black to be employed as a catalyst support was suspended in 100 ml of pure water to prepare a well suspended slurry which was then added to the above mixed solution. The solution was stirred for 2 minutes with a supersonic agitator so that the mixed solution was forced to penetrate into the pores of the support. The slurry was kept to be suspended and did not precipitate during the stirring operation.

The slurry was dried in an oven at 75° to 80° C. overnight for removing water. The dry powder thus obtained was washed three times with about 200 ml of distilled water so that the by-products were extracted and removed. This slurry was further dried overnight at 70° C. to obtain the carbon support supported with the platinum. The supporting amount of the platinum was 5 percent in weight.

To a mixed solution of 43 ml of a nickel formate aqueous solution (0.65 mmol), 43 ml of a cobalt acetate aqueous solution (0.65 mmol) and of 39 ml of a manganese acetate aqueous solution (0.25 mmol) was added an ammonium hydroxide aqueous solution until the pH of the solution reached 10, and the solution was stirred for 5 minutes. To this mixed solution of the nickel salt of the formate amine, of the cobalt salt of the acetate amine and of the manganese salt of the acetate amine was added 3 g of the above carbon support catalyst supported with only the platinum, and the solution was stirred for 10 minutes. After the slurry was dried and reduced in a hydrogen flow, the temperature of the atmosphere of the catalyst was raised to 700° C. so that the platinum, the nickel, cobalt and manganese were alloyed with each other.

The particle size of the alloy was about 30 Å, and the concentration of the platinum in the catalyst was 5 percent in weight.

After tetrafluoroethylene dispersion liquid was so added to this alloy catalyst that the ratio of the catalyst to the tetrafluoroethylene became 7:3, the mixture was applied to a carbon sheet hydrophobically treated which was then sintered to prepare an electrode.

The respective supporting amounts of the platinum, the nickel, the cobalt and the manganese were 0.1 $mg/cm^2$, 0.018 $mg/cm^2$, 0.018 $mg/cm^2$ and 0.009 $mg/cm^2$.

After the electrode was incorporated in a half cell of which an electrolyte was 100% phosphoric acid, the electrode potentials were measured while supplying a mixed gas shown in Table 1. The results are shown in Table 1. As shown in Table 1, the mixed gas A consisted of 2 percent of carbon monoxide, 28 percent of carbon dioxide and 70 percent of hydrogen and the mixed gas B consisted of 30 percent of carbon dioxide and 70 percent of hydrogen.

TABLE 1

Anode Characteristics of Electrocatalyst for Fuel Cell (Unit: mV)

| | Temperature | | | | | |
|---|---|---|---|---|---|---|
| | 160° C. | | 180° C. | | 200° C. | |
| Current Density | A | B | A | B | A | B |
| 0.1 $A/cm^2$ | 5 | 3 | 4 | 2 | 2 | 1 |
| 0.2 $A/cm^2$ | 10 | 6 | 6 | 3 | 5 | 2 |
| 0.3 $A/cm^2$ | 15 | 9 | 9 | 5 | 6 | 3 |
| 0.5 $A/cm^2$ | 30 | 15 | 18 | 10 | 11 | 7 |
| 1.0 $A/cm^2$ | 57 | 28 | 36 | 20 | 22 | 13 |

A: 2% CO/28% $CO_2$/70% $H_2$;
B: 20% $CO_2$/70% $H_2$

TABLE 2

Anode Characteristics of Electrocatalyst for Fuel Cell (Unit: mV)

| Current Density | Temperature | | | | | |
|---|---|---|---|---|---|---|
| | 160° C. | | 180° C. | | 200° C. | |
| | A | B | A | B | A | B |
| 0.1 A/cm² | 10 | 6 | 7 | 4 | 5 | 3 |
| 0.2 A/cm² | 20 | 12 | 14 | 9 | 10 | 6 |
| 0.3 A/cm² | 31 | 18 | 23 | 14 | 16 | 10 |
| 0.5 A/cm² | 63 | 29 | 49 | 22 | 31 | 16 |
| 1.0 A/cm² | 130 | 62 | 96 | 55 | 72 | 40 |

A: 2% CO/28% $CO_2$/70% $H_2$;
B: 20% $CO_2$/70% $H_2$

TABLE 3

Anode Characteristics of Electrocatalyst for Fuel Cell (Unit: mV)

| Current Density | Temperature | | | | | |
|---|---|---|---|---|---|---|
| | 160° C. | | 180° C. | | 200° C. | |
| | A | B | A | B | A | B |
| 0.1 A/cm² | 6 | 4 | 5 | 3 | 4 | 2 |
| 0.2 A/cm² | 18 | 7 | 10 | 6 | 8 | 5 |
| 0.3 A/cm² | 28 | 13 | 20 | 10 | 14 | 9 |
| 0.5 A/cm² | 46 | 21 | 36 | 16 | 23 | 12 |
| 1.0 A/cm² | 90 | 40 | 70 | 33 | 49 | 25 |

A: 2% CO/28% $CO_2$/70% $H_2$;
B: 20% $CO_2$/70% $H_2$

TABLE 4

Anode Characteristics of Electrocatalyst for Fuel Cell (Unit: mV)

| Current Density | Temperature | | | | | |
|---|---|---|---|---|---|---|
| | 160° C. | | 180° C. | | 200° C. | |
| | A | B | A | B | A | B |
| 0.1 A/cm² | 6 | 4 | 6 | 2 | 3 | 2 |
| 0.2 A/cm² | 15 | 7 | 10 | 6 | 7 | 4 |
| 0.3 A/cm² | 22 | 12 | 16 | 9 | 12 | 8 |
| 0.5 A/cm² | 41 | 20 | 32 | 16 | 20 | 10 |
| 1.0 A/cm² | 87 | 39 | 68 | 34 | 45 | 22 |

A: 2% CO/28% $CO_2$/70% $H_2$;
B: 20% $CO_2$/70% $H_2$

COMPARATIVE EXAMPLE 1

A catalyst was prepared according to the same procedures as those of Example except that only platinum was supported employing the amount twice of the platinum of Example. The platinum concentration in the catalyst was 10 percent in weight. The supported amount of the platinum in the electrode was 0.2 mg/cm².

The electrode potentials were measured similarly to Example employing the said electrode. The results are shown in Table 2.

COMPARATIVE EXAMPLE 2

A catalyst was prepared according to the same procedures as those of Example except that the atomic ratio of the platinum to the palladium was 50:50 employing one and one-half amount of the platinum. The platinum concentration in the catalyst was 7.5 percent in weight. The supported amount of the platinum in the electrode was 0.2 mg/cm².

The electrode potentials were measured similarly to Example employing the said electrode. The results are shown in Table 3.

COMPARATIVE EXAMPLE 3

A catalyst was prepared according to the same procedures as those of Comparative Example 2 except that the palladium was replaced with ruthenium so that the atomic ratio of the platinum to the ruthenium was 50:50. The platinum concentration in the catalyst was 7.5 percent in weight. The supported amount of the platinum in the electrode was 0.15 mg/cm².

The electrode potentials were similarly measured employing the said electrode. The results are shown in Table 4.

From Tables 1 and 2, it is apparent that the electrode potential of the platinum-nickel-cobalt-manganese four-element alloy catalyst of Example is about one-half of that of the element platinum catalyst of Comparative Example at a current density not less than 0.5 A/cm², and this comparison proves the excellence of the electrode properties of Example.

Also from Tables 1, 3 and 4, it is apparent that the four-element alloy catalyst of Example is proved to possess more excellent properties than those of the platinum-palladium catalyst of Comparative Example 2 and of the platinum-ruthenium catalyst of Comparative Example 3.

What is claimed is:

1. An electrocatalyst which comprises an inorganic support and four-element alloy essentially consisting of 10 to 39 atomic percent of platinum, 30 to 5 atomic percent of nickel, 30 to 5 atomic percent of cobalt and 30 to 3 atomic percent of manganese supported on the inorganic support.

* * * * *